Jan. 19, 1960  F. B. SHAW  2,921,867
RESIN COMPOSITION, PROCESS OF MAKING SAME, ARTICLE
IMPREGNATED THEREWITH AND PROCESS OF IMPREGNATING
Filed March 27, 1956
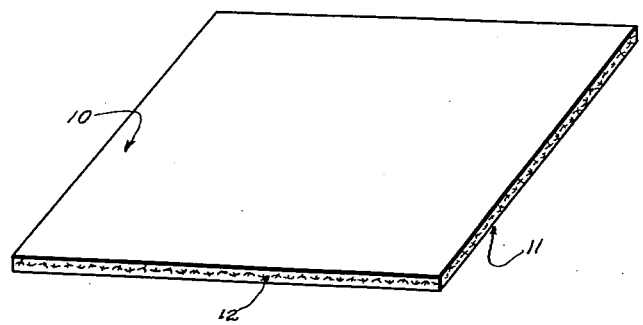
INVENTOR
FRED B. Shaw,
BY Mason, Porter, Diller & Stewart,
ATTORNEYS

United States Patent Office 2,921,867
Patented Jan. 19, 1960

2,921,867

RESIN COMPOSITION, PROCESS OF MAKING SAME, ARTICLE IMPREGNATED THEREWITH AND PROCESS OF IMPREGNATING

Fred B. Shaw, Milwaukee, Wis., assignor to Continental Can Company, Inc., New York, N.Y., a corporation of New York Application March 27, 1956, Serial No. 574,178

11 Claims. (Cl. 117—103)

This invention relates to improvements in lamination-type of resins, and is particularly concerned with a composition which provides superior electrical and mechanical properties.

It is known to employ polyester resins in the making of laminate articles: but difficulty has been encountered in providing mixed compositions including polyester resins and hydrocarbon polymers, which exhibit desirable compatibility and electrical behavior and competence of a satisfactory vat life and commercially satisfactory economy in production and use. Compositions which have been produced for good fire resistance whereby they are acceptable for electrical employments, have exhibited poor punching abilities in fabrication.

Other polymerization-condensation type extenders for polyesters have acted when present in significant or economically-worthy proportions, to inhibit the cure of the polyester or have so modified the properties of the cured composition that the latter did not have desirable combinations of electrical and mechanical properties. In cases where the cure was not inhibited, very short tank or pot life has been observed, so that day-by-day make-up was not feasible. A further basis of incompatibility with some such extenders is that their solubility in styrene is very slow and tedious, so that any attempt at speed-up can give non-homogeneous results.

Some polybutenes can be dissolved in styrenated polyester resins in amounts of 10 to 35% by weight, the higher molecular forms being of greater solubility. While the polybutenes dissolved in styrenated polyester resin, the stability suffers upon standing and a second phase (styrene-polybutene) forms. If the styrene content is increased, the ability to form solutions with polybutene decreases. Thus layering results with greater rapidity at the higher concentrations of the solute (styrene). This effect is so marked that stable polybutene-polyester-styrene mixtures cannot be formulated of low enough viscosity for practical use on the production laminator. The high-viscosity forms yield good solid polymers with extremely low dielectric constant and a degree of flexibility in thin sheets which is a combination of factors beyond that typical of commercial rigid polyesters: but they cannot be diluted or reduced in viscosity for effecting impregnation.

According to the present invention, a polyester resin, an alkyl hydrocarbon polymer such as polymerized butene, and a high molecular halogenated hydrocarbon material, as a solution in styrene or like polymerizable organic liquid may be employed in the preparation of laminated bodies, and cured to solid homogeneous masses: and in the cured or condensed state the composition exhibits flexibility, low cost, high dielectric strength and a desirable dielectric constant. These desirable electrical properties are also characteristic of laminates produced with this resin composition and such fibrous reenforcements as glass, paper, asbestos, nylon and other synthetic fibers, such laminates may have surfaces of resin and a core of reenforcement impregnated with the resin.

Polyester resin and alkyl hydrocarbon polymer are not normally compatible directly with one another: nor is the halogenated hydrocarbon material compatible with the polyester resin: and hence such compositions apparently have been deemed undesirable. As indicated above, mixtures containing polyester resin and polybutene have been found to be unstable in the pot, to cure poorly, and to yield tacky products of no commercial value.

It has now been found that such incompatability can be offset or compensated by employing third or bridging ingredients such as the aforesaid chlorinated hydrocarbon high-molecular material, when the unsaturated-acid types of polyester resins are compounded with hydrocarbon polymers, so that formulations with desirable and significant proportions of polyester and hydrocarbon polymer can be brought together in a fluid form for impregnation purposes, and their joint effects carried into the final product. It is noteworthy that such effects can be augmented by substituting saturated polybasic acids for a part of the unsaturated polybasic acid employed in the ester reactions with the polyhydric alcohol.

Polyester resins are complex products prepared by polymerizing the polyhydric alcohol esters of unsaturated polybasic acids. Typical polyhydric alcohols for the purpose are ethylene glycols, diethylene glycols, glycerine, erythritol, pentaerythritol, butylene glycols, sorbitol and mannitol. Typical unsaturated dibasic acids for the purpose are maleic and fumaric. It has been a practice to modify the properties of the resins, and obtain variation in their ultimate properties, by the use of substituted polyhydric alcohols and substituted unsaturated dibasic acids, e.g. by replacement of one or more hydrogen atoms per molecule by another element such as a halogen or an organic radical such as the methyl groups or an aromatic nucleus. Also, modification has been accomplished by partial replacement of the unsaturated dibasic acids with saturated dibasic acids such as phthalic, terephthalic, adipic, sebacic, and tetrachlorphthalic or with chlorendic acid, a hexachlorinated phthalic acid with the specific technical nomenclature of 1,4,5,6,7,7-hexachlorobicyclo (2,2,1)-5-heptene-2,3-dicarboxylic acid, which, through unsaturated, behaves like a saturated compound with respect to polymerization. The broad group of polyester resins of the described type and compositions may be thermoplastic if the chain-like polymeric ester molecules are not cross-connected to one another, or they may be thermosetting if the chain-like polymeric molecules are interconnected or cross-liked to one another. Commercial polyester resins are available in intermediate stages of polymerization, being known as incompletely polymerized resins, usually in a liquid form: and are thus delivered by the manufacturer to converters who compound them with fillers, pigments, reinforcements, catalysts and stabilizers: and then effect conversion to solid form or "curing" by the action of a catalyst with or without heating, whereby the polymerization is advanced so that the product has a higher molecular weight; this curing can be accomplished in connection with laminating, casting or molding operations.

According to this invention, the polyester resin component contains ester connections between polyhydric alcohol groups and polybasic acid groups; and is further characterized in that the polybasic acid radicals are at least in substantial part themselves unsaturated at the time the components are brought together, whereby cross-linking may be effected.

The conversion to the thermoset state, with cross-linkage can be accelerated: the purely polyester resins, as described above, are only very slowly converted to the thermoset state, and when so converted exhibit poor physical properties. Cross-linking for the purpose can be accomplished by introducing unsaturated molecules such as styrene, methyl styrene, vinyl acetate, and methyl methacrylate predominantly present in monomeric form, i.e. the cross-linking compounds are liquids and as added are monomers or largely pass to and through the monomer form during the reaction, with substantial absence of polymer forms in the reaction, and only limited amounts of dimers by preference. These compounds can be defined as monomeric ethylenic-linkage resin-forming substances. It has been found that desirable results are obtained with styrene, which is relatively economical.

Statisfactory polymerized hydrocarbon materials are polymerized butenes, which are available under the general trade name of "polybutene" and contain normal and branched chain groups, and have various molecular weight ranges dependent upon the procedure and extent of polymerization. Thus, a polybutene material with an average molecular weight of 840 is a liquid: while materials with average molecular weights of, say 1200, 1370, and 1500 are soft, sticky semi-solids or solids. As the molecular weight increases, the solid materials become progressively more resistant to flow and deformation. Other polymerized hydrocarbons, with other carbon numbers in the basic or monomeric molecule, can be employed, with attention to the desirable range of solubility and physical ability to flow during the curing.

Satisfactory halogenated hydrocarbons for present purposes are the wax-like chlorinated paraffins produced by substituting chlorine for a major part of the hydrogen atoms in natural or synthetic aliphatic high-carbon complexes. Typical commercial products are a liquid containing 40 percent of chlorine by weight, and a solid containing approximately 70 percent of chlorine by weight. It has been a practice to add small amounts (up to 5 percent) of erythritol, organic salts of tin, and dibasic lead phosphite, as stabilizers for preventing decomposition at elevated temperatures, with discoloration or the evolution of hydrochloric acid.

Illustrative practices in accordance with this invention are:

Example I

| | |
|---|---|
| Liquid polyester resin A ____parts by weight__ | 100 |
| Styrene _____do____ | 26–30 |
| Chlorinated paraffin wax (70 percent chlorine) part by weight__ | 20 |
| Polybutene (av. mol. wt. 1200)_____parts__ | 8 |
| Benzoyl peroxide _____do____ | 1 |
| Dibasic lead phosphate_____do____ | ½ |

The polyester resin A was a 30% styrenated polyester resin characterized by a high degree of substitution of maleic anhydride, Brookfield viscosity 2300 cps., typical SPI total cure time (150° F. to peak) of 6.8 minutes, and a peak temperature of 400° F.

The polybutene resin is dissolved in the styrene at room temperature, in a mixing tank or colloid mill with constant stirring, or in a metal drum with a motorized stirring paddle. When this dissolution is complete, the polyester liquid is added, with continued stirring. Upon completion of this admixture, the halogenated hydrocarbon is introduced and the stirring continued until the composition is uniform. At this stage, pigments and filling materials can be added and stirred. At this time or later, the catalyst, illustratively benzoyl peroxide, is added: and the composition is ready for employment. The addition of finely divided calcium carbonate reduces the over-all cost per unit quantity of the catalyzed resin mixtures. Aromatic phosphates such as tricresyl phosphate may be added as colloid stabilizer.

A typical procedure of employment is to saturate therewith a bibulous kraft saturating paper, alpha cellulose core paper, glass felt or fabric, and place the same upon a surfacing sheet of cellophane. Several layers may thus be superposed to attain a specified thickness. A second cellophane sheet is placed over the mass and minor pressure employed to smooth the material and bring it to the specified dimension. The curing can be effected from an induction temperature of 180 degrees F.

With the specific example above, employing styrene, the curing temperature is held low, to avoid loss by volatility of the styrene. Thus, when induction begins at 180° F., the material is held at 200° F. or below until the resin has gelled: the temperature employed and its duration, for this initial phase of curing being determined by the observation of styrene. In general, there is a close relationship between time and temperature: the cure being faster with higher temperatures. Hence, after gelling, the temperature can be raised or allowed to rise to terminal temperatures effective for thorough curing.

Another typical procedure on a production basis is to employ a continuous method in which the reenforcement material is passed through dip tanks or vats containing the composition, with control of quantity as the reenforcement sheets leave the dip tanks: the sheets for multi-laminates are then brought between combining rolls where they are simultaneously joined between the cellophane or other external supporting webs, and the whole is compressed to the desired thickness. This laminate structure is then introduced to the series of ovens. With the formulation of Example I, a standard operating procedure is to maintain the initial oven at 180° F., with the later ovens at progressively higher temperatures so that the terminal oven shows an internal temperature of 300° F.

In either case, the curing of the composition in the presence of the reenforcing material saturated or impregnated thereby, and with the external support of the cellophane or like material, leads to a product from which the cellophane or other external sheet may be stripped away.

The product, upon removal of the cellophane, exhibits a satisfactory high gloss. When parchment sheets of low porosity are substituted for the surfacing cellophane sheets, a dull or mat finish is obtained. Laminates of thicknesses of 0.035 and 0.031 inch thickness in finished form have been prepared, respectively, by employment of bibulous kraft paper of 11-mil and 9-mil thickness, as single-reinforcement laminates. The product has a brown color.

Sheets 0.035 inch thick weigh approximately 0.2325 pound per square foot, with 58.4% content of resin mixture. It is less subject to fracture than comparable commercial polyester products.

Illustrative electrical properties are:

Dielectric strength (short time, ASTM D–149)—1023 volts/mil of thickness

Dielectric strength (step by step, ASTM D–149)—773 volts/mil of thickness

Dielectric constant at $1\times10^6$ cycles (ASTM D–150)—2.8

The composition can be employed for impregnating alpha cellulose. Soft, white, core paper was saturated; and two layers or plies were brought together, and cured at approximately 200 degrees F., to a finished thickness of 0.031 inch, weighing 0.2085 lb. per square foot, and having a resin content of 67.8%. It closely resembled the above laminated material, in physical and chemical properties.

Each material was found much less subject to fracture than XXP grade material (NEMA specifications). In general, highly satisfactory curing is effected with general oven temperatures of 200 degrees F., except for a brief residence in a terminal oven at 250 degrees F. There is no surface tackiness of the finished product, and Barcol values (by spring-loaded point hardness tester) are in the range of 10–40.

As another example of practice, a laminate of final thickness of 0.062 inch was prepared with three plies of 0.020 inch thickness soft white alpha cellulose core paper, cured as before. This product had a weight of 0.4170 pound per square foot, with a resin mixture content of 67.8 percent; hardness (Barcol) 35–40; moisture absorption (by immersion or in humidity cabinet for 24 hours) of 3.68 percent; weight loss (immersion 24 hours) 2.83 percent; hot iron test (by a flat iron at 450 degrees F. placed on laminate for 5 minutes, with observation for blisters and appearance)—satisfactory; dielectric constant at $1 \times 10^6$ cycles 2.84; power factor at same frequency 0.0357; loss factor at same frequency 0.1060.

Flexible laminate materials have been prepared by impregnating two plies of loom finish glass cloth (#116 specification), and curing between cellophane sheets to an extremely uniform thickness of 0.009 to 0.010 inch: the weight is 0.0824 pound per square foot, with a resin mixture content of 48.4 percent.

Another laminate was prepared with two plies of the #116 loom finish glass cloth, with a single ply of #128 loom finish glass cloth between the same: each being impregnated with the above formulation. On curing between cellophane sheets, a thickness of 0.016 to 0.018 inch was obtained: a weight per square foot of 0.1515 pound, and a resin content of 43.7 percent. This product had a dielectric constant at 60 cycles of 5.18 and at one megacycle of 3.84. The power factor at 60 cycles was 0.094, and at one megacycle was 0.0241. The loss factor at 60 cycles was 0.489 and at one megacycle was 0.0925. The dielectric strength (short time method) was 1285 volts per mil thickness, and the dielectric strength (step-by-step method) was 782 volts per mil thickness.

This composition of Example I was made up on a commercial basis, with continuous impregnation of webs traveling through vats containing the liquid compound, as described above: a bleached kraft paper base was employed as the reenforcement: and the products at standard thicknesses of 0.031, 0.040, 0.047 and 0.062 were prepared within tolerances of 0.003 to 0.005 inch for the successive thicknesses. Minimum specification values for electrical properties, flexibility and punching qualities at room temperature, based upon 1/16 inch thickness are:

| | |
|---|---|
| Density, grams per cc. | 1.27 |
| Specific volume, cu. in. per lb. | 21.8 |
| Dielectric strength, volts per mil: | |
|   Short time | 850 |
|   Step by step | 550 |
| Dissipation factor @ 1 mc. cond. A | .031 |
| Dielectric constant @ 1 mc. cond. A | 3.7 |
| Arc resistance, seconds (minimum) | 76 |
| Flexural strength, p.s.i.: | |
|   Lengthwise | 16,500 |
|   Crosswise | 13,500 |
| Tensile strength, p.s.i.: | |
|   Lengthwise | 9,000 |
|   Crosswise | 6,200 |
| Compressive strength, p.s.i.: flatwise | 20,000 |
| Heat resistance, deg. F.: | |
|   Intermittent | 275 |
|   Continuous | 250 |
| Water absorption, percent 24 hours | 3.4 |
| Punching characteristics: | |
|   At room temp. | Excellent |
|   At hot | Excellent |

Similarly commercial runs made by vat dipping of traveling webs, under the same conditions as above but with employment of a brown paper base showed essentially the same characteristics. Except for a slight reduction in punching characteristics at room temperature, from the above tabulation, they were still superior to reference commercial materials: and the following specifically different strength characteristics from those set out in the tabulation just above:

| | |
|---|---|
| Arc resistance, seconds (minimum) | 72 |
| Flexural strength, p.s.i.: | |
|   Lengthwise | 19,600 |
|   Crosswise | 14,000 |
| Tensile strength, p.s.i.: | |
|   Lengthwise | 12,200 |
|   Crosswise | 7,500 |
| Compressive strength, p.s.i.: flatwise | 25,500 |
| Water absorption, percent 24 hours | 3.6 |
| Punching characteristics: | |
|   At room temp. | Good |
|   At 200° F. | Excellent |

The specific values, in the tabulations just above, indicate the behavior of the poorest of a number of batches of material made on the production basis; that is, all of the material so made satisfy such minimum specification. As noted in the earlier statement of behavior, many batches exceed this minimum specification.

*Example II*

The following composition was made up in the general order described above:

| | Parts by weight |
|---|---|
| Liquid polyester resin B | 60 |
| Styrene | 15 |
| Chlorinated paraffin wax (70 percent chlorine) | 15 |
| Antimony oxide | 10 |
| Polybutene (aver. mol. wt. 1200) | 7½ |
| Benzoyl peroxide | 1 |
| Dibasic lead phosphite | ½ |

The polyester resin B was a styrenated polyester resin based on tetrachlorphthalic anhydride, Brookfield viscosity 5500 cps., typical SPI total cure time (150° F. to peak) of 7.4 minutes, and a peak temperature of 410° F.

This was employed as above, in the impregnation of reinforcement materials, with curing. The antimony oxide is present as a filler and also has some stabilizing properties and flame retardance. This formulation is extremely fire resistant, even when employed in the form of paper base laminates.

Calcium carbonate and calcium sulfate in finely divided form are excellent fillers for economy, and give some mechanical reenforcement value in stiffening the cured compositions. Titanium dioxide and burnt umber can be employed for color control, along with very finely divided earth oxides. In general, earth oxides as such or as carbonates, sulfates, etc. may be employed. It has been found advisable to avoid inclusion of carbon, sulfur, sulfides, and copper salts as fillers, for the reason that these materials are reactive during the curing operation and hence do not have the inert properties of the fillers.

A like composition to that of Example II, in which 50 parts of finely divided calcium carbonate was employed in place of the 10 parts of antimony oxide, was employed to impregnate 0.015 inch, soft, white (alpha cellulose) core paper; and two plies of this were joined, surfaced with cellophane, pressed, and cured. The product was about 0.031 inch thick and weighed 0.1930 lb. per square foot: it had a resin mixture content of 67%. It was found that the pot life was increased from three days to eight days by the substitution of the calcium carbonate for the antimony oxide.

Barcol values upon curing such composition from an initial temperature of 180 degrees F. and through a final temperature of 250 degrees F. have been as high as the range 45–50.

An article prepared in accordance with this invention may be a sheet as shown on the accompanying drawing, in which the thickness has been exaggerated for clearness. The surfaces 10, 11 are illustrated as smooth and provided by the cured resin according to Example I above. Between the faces is a reenforcing layer 12 which may be of saturating paper, core paper, glass felt or fabric.

It is obvious that the illustrative practices are not restrictive; and that the invention can be practiced in many ways within the scope of the appended claims.

What is claimed is:

1. A fluid resin composition comprising for the major component a polymerizable polyester resin which is the reaction product of a polyhydric alcohol with a polybasic unsaturated acid reagent selected from the group consisting of maleic and fumaric acids; polymerized butene having an average molecular weight of 840 to about 1500; a halogenated paraffin hydrocarbon selected from the group consisting of liquid and solid aliphatic highcarbon complexes containing 40 to 70 percent by weight of halogen; and a polymerizable organic liquid selected from the group of monomeric substances consisting of styrene, methyl styrene, vinyl acetate and methyl methacrylate and which has the foregoing components in solution therein.

2. A resin composition as in claim 1, in which the polyester resin is formed by conjoint esterification with a mixture of a said unsaturated dibasic organic acid and an organic acid selected from the group consisting of phthalic, terephthalic, adipic, sebacic, tetrachlorphthalic and chlorendic acids.

3. A resin composition as in claim 1, and containing inert pulverulent filler and a stabilizer for the halogenated material.

4. A resin composition as in claim 1, in which the polymerizable organic liquid is styrene.

5. A curable fluid resin composition consisting for the major component of a polymerizable polyester resin which is the reaction product of a polyhydric alcohol with a polybasic unsaturated acid reagent selected from the group consisting of maleic and fumaric acids; polymerized butene with an average molecular weight of 840 to about 1500; a halogenated paraffin hydrocarbon selected from the group consisting of liquid and solid aliphatic high-carbon complexes containing 40 to 70 percent by weight of halogen; and a polymerizable organic liquid selected from the group of monomeric substances consisting of styrene, methyl styrene, vinyl acetate, and methyl methacrylate, said liquid having the foregoing components in solution therein.

6. The process of preparing a reinforced material of high electrical resistance and low dielectric constant, which comprises impregnating a sheet of porous reinforcing material with a curable fluid composition comprising for the major component a polymerizable polyester resin which is the reaction product of a polyhydric alcohol with a polybasic unsaturated acid reagent selected from the group consisting of maleic and fumaric acids; polymerized butene with a molecular weight from 840 to about 1500; a halogenated paraffin hydrocarbon selected from the group consisting of liquid and solid aliphatic high-carbon complexes containing 40 to 70 percent by weight of halogen; and a polymerizable organic liquid selected from the group of monomeric substances consisting of styrene, methyl styrene, vinyl acetate, and methyl methacrylate, said liquid having the foregoing components in solution therein, and heating the same to effect curing of the composition.

7. The process as in claim 6, in which the polyester is formed by esterification with a mixture of a said unsaturated acid and an organic acid selected from the group consisting of phthalic, terephthalic, adipic, sebacic, tetrachlorphthalic and chlorendic acids; in which the halogenated hydrocarbon is a chlorinated hydrocarbon material containing 40 to 70 percent of chlorine by weight; and in which the said organic liquid is styrene.

8. The process in claim 6, in which the curable fluid composition includes a resin-curing catalyst, and in which the heating of the impregnated sheet is to an initiating temperature of about 180 degrees F. and below the temperature of substantial volatilization of the said organic liquid whereby to procure gelling of the composition, and thereafter it is heated to a higher temperature not exceeding an oven temperature of about 300 degrees F. to complete curing.

9. The article comprising the product of claim 8, being a porous reinforcing material having the cured reaction product of the curable fluid composition as an impregnation thereof; said article being characterized by high dielectric strength and low dielectric constant, mechanical flexibility in sheet form, and ability to endure mechanical punching at room temperature without shattering.

10. The reaction product obtained by successively dissolving in a polymerizable organic liquid selected from the group consisting of styrene, methyl styrene, vinyl acetate and methyl methacrylate, for the major component a polymerizable polyester resin which is the reaction product of a polyhydric alcohol with a polybasic acid reagent selected from the group consisting of maleic and fumaric acids; a halogenated paraffin hydrocarbon selected from the group consisting of liquid and solid aliphatic high carbon complexes containing 40 to 70 percent by weight of halogen; and polymerized butene having an average molecular weight of 840 to about 1500; applying the said solution in the presence of benzoyl peroxide as an impregnant to a sheet of porous reinforcing material; heating to an initiating temperature of about 180 degrees F. and below the temperature of substantial volatilization of the said organic liquid whereby to procure gelling of the composition, and thereafter heating to a higher temperature not exceeding an oven temperature of about 300 degrees F.

11. A reaction product as in claim 10, in which the solution comprises 26 to 30 parts by weight of styrene; 100 parts by weight of a 30 percent styrenated polyester resin characterized by a high degree of substitution of maleic anhydride, Brookfield viscosity 2300 cps., typical SPI cure total cure time (150 degrees F. to peak) of about 6.8 minutes; 20 parts by weight of chlorinated paraffin wax (70 percent chlorine), and 8 parts by weight of polybutene of average molecular weight 1200.

References Cited in the file of this patent

UNITED STATES PATENTS

| | | |
|---|---|---|
| 2,255,313 | Ellis | Sept. 9, 1941 |
| 2,498,099 | Tawney et al. | Feb. 21, 1950 |
| 2,541,689 | Carson | Feb. 13, 1951 |
| 2,627,297 | Felten | Feb. 3, 1953 |
| 2,676,950 | Sparks et al. | Apr. 27, 1954 |